Patented Dec. 22, 1942

2,306,278

UNITED STATES PATENT OFFICE 2,306,278

ARTICLE OF MANUFACTURE

Frank H. Reichel and Ralph T. K. Cornwell, Fredericksburg, Va., assignors to Sylvania Industrial Corporation, Fredericksburg, Va., a corporation of Virginia No Drawing. Application February 16, 1940, Serial No. 319,258

13 Claims. (Cl. 229—3.5)

This invention relates to a method for treating transparent organic sheet materials. In particular it relates to a method for treating sheet materials formed of regenerated cellulose, and to the article so produced, and to correlated improvements designed to enhance the properties and to increase the utility of such product. The invention has special reference to a wrapper formed of transparent material for use in wrapping wax products such as candles.

In the manufacture of pellicles of regenerated cellulose it is now customary to add to the sheet, or to leave therein, a small amount of alkali.

It has been found desirable to wrap wax candles with transparent flexible sheets or pellicles formed from organic hydrophilic colloids such, for example as regenerated cellulose. While the invention will be illustrated by reference to wax candles the invention is applicable to wax products in general, such for example as sealing wax, wax sculptures, and articles coated with animal, mineral and vegetable waxes. A difficulty has been experienced in this art in that the wax appears to adhere to such prior wrappers. Furthermore, such wrappers when used with wax candles become frosty in the course of time, thus detracting from the transparency and giving an unsightly appearance.

To overcome the foregoing disadvantages and difficulties it is a general object of the invention to provide a wrapper for wax products which will not become frosty or opaque after a period of time, and which will have little tendency for the wax to adhere or transfer to the wrapper.

It is a specific object of the invention to provide as an article of commerce, a wax candle wrapped in an improved transparent cellulosic sheet material.

Other objects of the invention will in part be obvious and will in part appear hereinafter.

It has been discovered that in those cases where transparent organic hydrophilic sheet materials are used as wrappers for wax candles and where in the course of time such wrapping materials become "frosty" due to transfer of wax to the wrapper that such wrappers are chemically alkaline or nearly neutral but on the alkaline side, having a pH of 7 or greater. It has been further discovered that if wax candles are wrapped with such material having a pH less than 7 no visible transfer of wax to the wrapper occurs and the wrapper does not become frosty or discolored over a long period of time.

In the practice of the present invention, in its broadest aspects, a transparent sheet formed of an organic hydrophilic colloidal material may be rendered non-alkaline, having a pH of less than 7, by the addition of an acidic substance such as an inorganic or organic acid, acid salt, or acid forming substance to the sheet material. Such sheets may then be advantageously used as wrappers for wax candles without becoming frosty or sticking to the wax.

The invention accordingly comprises the several steps and the relation of one or more of such steps with respect to each of the others, and the product possessing the features, properties and the relation of elements which are exemplified in the following detailed disclosure, and the scope of the application of which will be indicated in the claims.

The sheet material of the invention may be formed from organic hydrophilic colloidal material such, for example, as regenerated cellulose which may be regenerated from viscose or cuprammonium solutions of cellulose, alkali-soluble and/or water-soluble cellulose ethers, water-swelling cellulose esters, gelatine, casein, water-swelling artificial resins and the like.

Suitable acid-forming substances which may be used in the invention comprise acid salts, acid derivatives, acid buffers, and organic and inorganic acids. The acid-forming substances are characterized by being water-soluble, non-toxic, and by having a tendency not to form crystalline structures within the wrapping material. Suitable inorganic acids which may be used comprise hydrochloric acid, sulfuric acid, nitric acid, boric acid and the like. Acid salts and buffers may also be used to advantage. Acid salts which may be used comprise ammonium sulfate, ammonium nitrate, ammonium dihydrogen phosphate, zinc sulfate, and the like. There may also be used certain acid derivatives which have acid characteristics, such as chloropropionic acid, chloracetic acid, benzenesulfonic acid, and the like. It has been found that the majority of the strong inorganic acids and similar substances, in addition to preventing the pellicle from becoming frosty and from adhering to the candle, tend to embrittle the wrapper. When a less stiff and more pliable wrapper is preferred an hygroscopic organic acid should be used.

Suitable organic acids which may be used comprise the mono- and polycarboxylic organic acids, such as phthalic acid, benzoic acid, citric acid, tartaric acid, malic acid, lactic acid, formic acid, acetic acid, and the like. Preferably the organic acid chosen should have hygroscopic properties since this tends to keep the treated wrapping material soft and flexible. It is also advisable to use acid substances which are liquids at room temperatures as the danger of crystallization in the wrapper is avoided. It is also to be understood that the scope of the invention includes various combinations of these acid-forming substances whenever such is desired.

Alternatively, buffers may be added to organic acids in order to maintain the acid characteristics and to insure the maintenance of the acid characteristics of the organic acids used in the invention. Such buffers comprise monoammonium phosphate, potassium acid tartrate, potassium acid phthalate, and the like. These buffer materials as well as the acid-forming substances are all added in minute amounts so as not to deleteriously affect the wrapper sheet or its transparency.

In practicing the invention it is only necessary to combine the transparent sheet material with an acid-forming substance in such amount that a water extract of the sheet will yield a pH of less than 7. It is desirable, however, that the pH of the water extract of the finished sheet lie between 5 and 6.5. In the preferred embodiment of the invention a pellicle of regenerated cellulose is combined with lactic acid sufficient in quantity to produce a wrapping material having a pH of from 6 to 5.5.

The pellicles may be combined with the acid-forming substance either by way of a coating or by way of impregnating the pellicle during the course of manufacture. By way of illustration, a pellicle of regenerated cellulose may be combined with an acid-forming substance dissolved in a suitable solvent as by spraying, or by passing the pellicle through a coating bath containing the acid-forming substance. Such solvent should be preferably volatile and should not have solvent properties for the pellicle itself. Suitable solvents comprise the ethers, acetone, ketones, alcohols, benzene, water and the like. After application the solvent is evaporated from the surface of the pellicle by means of warm air, heated rollers and the like. Alternatively, the acid-forming substance may be dissolved in suitable proportions in combination with a non-aqueous dispersion of a hydrophilic anti-sticking composition such as disclosed in the co-pending application of Ralph T. K. Cornwell, Serial No. 223,223, filed August 5, 1938, entitled "Article and process for making the same." The water-soluble acid-forming substance combines with the pellicle after such application, while the water-insoluble anti-sticking agent remains upon the surface in the form of fine particles.

As a further illustration, the acid-forming substance may be included in the conventional softening bath wherein the pellicles of regenerated cellulose are plasticized in accordance with a manner well known in the art, such as in a bath of glycerine, a glycol or a glycol ether. In this method the pellicle is impregnated with the acid-forming substance.

It is also within the purview of the present invention to combine the acid-forming substance with the pellicle at other stages in the course of manufacture, such for example as by bleaching the pellicle with an acid-bleaching agent and thereafter in completely removing the bleaching agent.

The pellicle may be in the form of a sheet, band, tubing, bag or shaped container. The pellicle may be placed around the wax product or the wax product may be molded in the pellicle.

By way of illustration but not by way of limiting the scope of the invention, there is given the following example:

*Example.*—A sheet of cellulose hydrate having a thickness of approximately 0.00088 of an inch is treated with an aqueous solution of glycerine and dried so as to contain from 13% to 16% by weight of glycerine, and from 6% to 9% moisture. The dried sheet is then passed through a bath containing 800 gms. of an aqueous lactic acid solution (on the basis of 80% solid lactic acid by weight) dissolved in approximately 40 gallons of anti-sticking agent comprising a solution of 80 parts by weight of triple-pressed stearic acid and 20 parts of high viscosity ethyl cellulose in a solvent mixture comprising 80 parts of ethyl alcohol and 20 parts of toluene. The mixture of stearic acid and ethyl cellulose comprises about 0.2% by weight of the solution. This is substantially in accordance with the disclosure set forth in the aforementioned co-pending application, Serial No. 223,223, having only the acid-forming substance supplied in addition thereto. The treated sheet is then passed through squeeze rolls set at approximately 0.0015 inch and the excess solution is removed from the surface of the sheet. The treated sheet is dried in accordance with the practice of the art, preferably below the melting point of the stearic acid. Other fatty substances can be substituted in place of the stearic acid used in the anti-sticking agent such as myristic acid, palmitic acid, arachidic acid, and the like. Forty gallons of the above composition will coat approximately 500 lbs. of the regenerated cellulose, and the dried sheet will then contain approximately 0.32% excess lactic acid. The anti-sticking agent forms a multiplicity of fine, separate particles upon the surface of the sheet. An aqueous solution prepared from a sample of the treated sheet should have a pH of about 6.

If use of a solvent is made in applying the acid substance to the sheet material which causes loss of moisture content in the base sheet the sheet may be reconditioned by a post-humidification or by a water-vapor process in a known manner. The sheet material may be treated in accordance with the invention while the sheet is in the wet gel state, that is while it contains an excess of water over that present in the commercially dried product, and the excess water is simultaneously evaporated during the evaporation of the solvent for the acid substance and other substances which may necessarily be present.

It will be understood that the alkalinity of the regenerated cellulose sheet material before treatment with the above acid-forming substance must be considered in order to render the sheet acid after such treatment. In Example 1, the original sheet of regenerated cellulose before coating with the aforementioned composition was found to contain approximately 0.30% alkalinity calculated as NaOH. Sufficient lactic acid was added to compensate for this alkaline content and to render the sheet acid after treatment. The lactic acid used in the composition therefore must necessarily be varied for those pellicles of regenerated cellulose containing larger or smaller amounts of alkali determined as being present in the original sheet material.

The following table is given for the purpose of showing the effect of a change in pH in the regenerated cellulose sheet material when used as a candle wrapper for wax candles. It will be noted that a change in the sheet material from one having a pH greater than 7 to one having a pH of less than 7 produces a material which when used as a wrapper for wax candles does not frost or "bloom," and which does not stick to the candle after a considerable length of time.

Table

*Regenerated cellulose sheet, thickness approximately 0.001", used as wrapping material for wax candles.*

| pH | 40 hrs. | 7 days | 12 days |
|---|---|---|---|
| 9.0 | Bloom | Bloom | Bloom. |
| 7.5 | do | do | Do. |
| 6.8 | Border line, i. e., some clear, some bloom. | Border line | Border line. |
| 6.0 | No bloom | No bloom | No bloom. |
| 5.5-6.0 | do | do | Do. |

It is preferable from some aspects of the invention to use sheet material having an original excess of alkaline content rather than a so-called acid-bleached material. This is particularly true when a more pliable candle wrapper is desired. The acidification of an alkaline sheet material according to the preferred embodiment of the invention to give the sheet material a pH of approximately 6 results in producing a wrapping material which appears to be much less brittle than the acid-bleached material.

The sheet treated in accordance with the invention is characterized by having substantially the same transparency, gloss and smoothness to the touch as before treatment, and is further characterized by having a non-tacky surface. Such sheet material has the added advantage of remaining clear and non-adhesive when used as a wrapper for wax candles.

Since certain changes in carrying out the above process and certain modifications in the article which embody the invention may be made without deterring from its scope, it is intended that all matter contained in the above description shall be interpreted as illustrative and not in a limiting sense.

Having described our invention, what we claim as new and desire to secure by Letters Patent is:

1. As an article of manufacture, a sheet material for wrapping wax candles comprising a pellicle formed of a hydrophilic colloidal material combined with an anti-sticking agent and an anti-frosting agent comprising lactic acid, said anti-sticking agent preventing the pellicle from adhering to other pellicles when stacked and said anti-frosting agent preventing the pellicle from adhering to the wax and becoming frosted when used as a wrapper for wax candles.

2. As an article of manufacture, a wrapping material for products having wax surfaces, the wrapping material formed of a sheet of regenerated cellulose combined with lactic acid, said sheet having a pH between 5 and 6.

3. As an article of manufacture, a wrapping material formed of a flexible sheet of hydrophilic colloidal material impregnated with lactic acid, said sheet having a pH less than 7.

4. As an article of manufacture, a candle unit comprising in combination a wax candle and a wrapping material thereon and in contact with the wax, said wrapper formed of regenerated cellulose and impregnated with an acidic substance, the wrapping material having a pH less than 7, whereby the wrapper is prevented from adhering to the candle and from becoming discolored.

5. As an article of manufacture, a candle unit comprising in combination a wax candle and a wrapping material thereon formed of a flexible sheet of hydrophilic colloidal material impregnated with lactic acid, said sheet having a pH less than 7.

6. As an article of manufacture, a candle unit comprising in combination a wax candle and a wrapping material thereon and in contact with the wax, said wrapping material formed of a flexible sheet of hydrophilic colloidal material combined with an anti-sticking agent and an anti-frosting agent comprising an acidic substance, said sheet having a pH less than 7, the anti-sticking agent preventing the sheet from adhering to other sheets when stacked and the anti-frosting agent preventing the sheet from adhering to the candle and from becoming discolored.

7. As an article of manufacture, a wrapped unit comprising in combination an article having a wax surface and a wrapper thereon and in contact with said wax, said wrapper comprising a pellicle formed of a hydrophilic organic colloid impregnated with an acidic substance, said pellicle having a pH less than 7, whereby the wrapper is prevented from adhering to the wax.

8. As an article of manufacture, a wrapped unit comprising in combination an article having a wax surface and a wrapper thereon and in contact with said wax, said wrapper comprising an uncoated material formed of regenerated cellulose impregnated with an acidic substance, said sheet material having a pH less than 7, whereby the wrapper is prevented from adhering to the wax.

9. As an article of manufacture, a wrapped unit comprising in combination a wax candle and a wrapper thereon and in contact with said wax, said wrapper comprising an uncoated pellicle formed of transparent hydrophilic colloidal material impregnated with an acidic substance, said pellicle having a pH less than 7, whereby the wrapper is prevented from adhering to the wax.

10. As an article of manufacture, a wrapped unit comprising in combination an article having a wax surface and a wrapper thereon and in contact with said wax, said wrapper comprising a pellicle formed of a hydrophilic organic colloid impregnated with an acidic substance, said pellicle having a pH not greater than 6, whereby the wrapper is prevented from adhering to the wax.

11. As an article of manufacture, a wrapped unit comprising in combination an article having a wax surface and a wrapper thereon and in contact with said wax, said wrapper comprising a pellicle formed of a hydrophilic organic colloid impregnated with an acidic substance, said pellicle having a pH of between 5 and 6.5.

12. As an article of manufacture, a wrapped unit comprising in combination an article having a wax surface and a wrapper thereon and in contact with said wax, said wrapper comprising a pellicle formed of a hydrophilic organic colloid impregnated with an acidic substance and a minor quantity of a buffer, the said pellicle having a pH less than 7, whereby the wrapper is prevented from adhering to the wax.

13. As an article of manufacture, a wrapped unit comprising in combination an article having a wax surface and a wrapper thereon and in contact with said wax, said wrapper comprising a pellicle formed of a hydrophilic organic colloid impregnated with a carboxylic organic acid, said pellicle having a pH less than 7, whereby the wrapper is prevented from adhering to the wax.

FRANK H. REICHEL.
RALPH T. K. CORNWELL.